United States Patent [19]
Wieland

[11] 3,887,096
[45] June 3, 1975

[54] QUICK ATTACHMENT AND RELEASE DEVICE

[76] Inventor: Lloyd R. Wieland, Dazey, N. Dak. 58429

[22] Filed: Oct. 11, 1973

[21] Appl. No.: 405,625

[52] U.S. Cl. ................ 214/145; 16/174; 37/117.5; 292/218
[51] Int. Cl.............................................. E02f 3/70
[58] Field of Search........ 214/145; 37/117.5, 118 R, 37/118 A; 16/171, 172, 174; 292/218, 314

[56] References Cited
UNITED STATES PATENTS

| | | | |
|---|---|---|---|
| 1,496,466 | 6/1924 | Jackson | 16/174 X |
| 3,118,369 | 1/1964 | Antonucci | 292/218 X |
| 3,583,589 | 6/1971 | Leijon | 214/145 X |
| 3,606,052 | 9/1971 | Schurz | 214/145 |
| 3,718,222 | 2/1973 | Foster | 214/145 |
| 3,760,883 | 9/1973 | Birk | 214/145 X |

Primary Examiner—Robert B. Reeves
Assistant Examiner—David A. Scherbel
Attorney, Agent, or Firm—Dorsey, Marquart, Windhorst, West and Halladay

[57] ABSTRACT

A quick attachment and release device for guided and automatic releasable attachment of a first member to a second member, useful typically for attaching an agricultural implement to and releasing it from a pair of spaced actuating arms of a loader attached to a tractor. The quick attachment and release device consists of two registrable elements, one of which is permanently attached to the first member and the other of which is permanently attached to the second member. The elements of the quick attachment and release device are characterized by a C-shaped bracket and a rectangular key whereby the key can be moved from a position independent of the bracket to a position of locked engagement therewith. The quick attachment and release device is generally aided by an orientation bracket for guiding the rectangular key toward engagement with the C-shaped bracket.

8 Claims, 6 Drawing Figures

PATENTED JUN 3 1975 3,887,096

SHEET 1

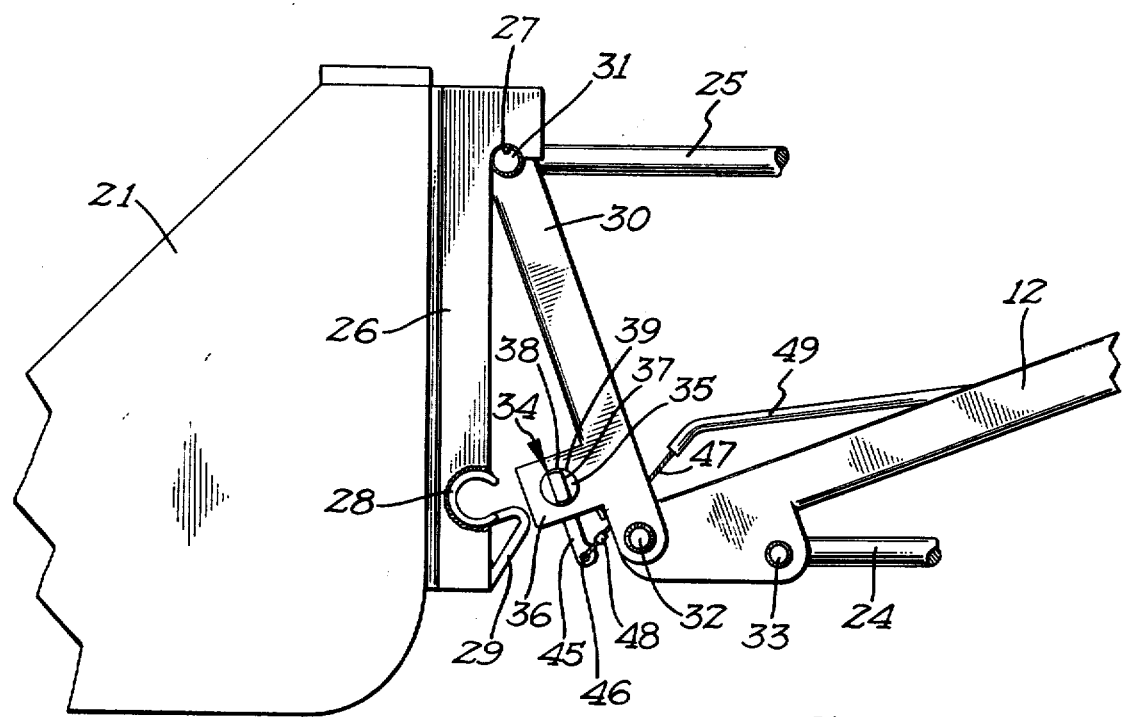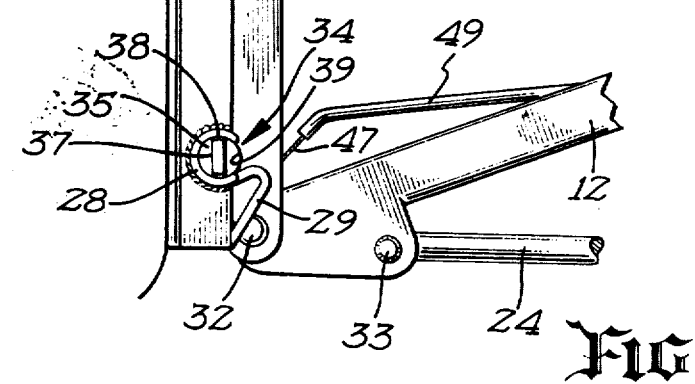

QUICK ATTACHMENT AND RELEASE DEVICE

BACKGROUND OF THE INVENTION

The present invention relates to the field of attachment and release devices for releasably attaching agricultural implements to the spaced actuating arms of a loader. Such loaders, when attached to a tractor, are particularly versatile items of machinery when various agricultural implements may quickly and easily be interchanged for use. Typical implements which are used with such loaders include snow scoops, dirt scoops, rock pickers, silage forks, manure forks, and hay baskets. With such a wide range of implements available, the versatility of a loader depends to a great extent upon a quick attachment and release device. When such an attachment and release device is provided, the desirability and usefulness of a loader is greatly enhanced.

In the past, agricultural implements have often been bolted to the spaced actuating arms of a loader during periods of use. This makes it necessary for the operator to dismount from the tractor to attach the implements to the loader. Since such implements are generally heavy items of machinery having considerable size, a great deal of time and effort is required. Also, attaching such an implement often requires the services of more than one person. In addition, attaching an implement to a loader by means of bolts and nuts requires the use of tools. Finally, since attaching the implement to the loader by this means is a manual operation, holes somewhat larger than the diameter of the bolts are provided to aid in aligning the holes in the implement with the corresponding holes in the loader and placing the bolts through the substantially aligned holes. Nevertheless, this is a difficult task in which a substantial chance of injury exists.

After a period of use, dirt and corrosion often encases the bolts and nuts, rendering removal of the agricultural implement from the loader quite difficult. Also, the fact that the implement and loader are typically used in an abrasive environment along with the existence of areas of high point stress concentrated at the points where the implement is bolted to the loader results in considerable wear at such points and leads to occasional fatigue and fracture of the metal brackets of the loader and implement. As a result of these and other factors, the potential flexibility and desirability of using a loader in connection with the many agricultural implements adaptable thereto simply can't be fully met.

In an effort to overcome some of the disadvantages experienced by bolting agricultural implements to loaders, the bolts and nuts have sometimes been replaced by pins. This means of attaching and releasing implements to a loader results in the saving of some time and effort. Also, the need for tools is substantially eliminated as a result of using pins. Nevertheless, many of the same problems experienced by using bolts and nuts continue to exist when pins are substituted.

When pins are used, the operation is still manual, and the chance of injury is not reduced. Also, as with the use of bolts and nuts, the operator has to dismount from the tractor to attach or release an implement, causing a loss of valuable time. In addition, the problems caused by an accumulation of dirt and corrosion which commonly encase bolts and nuts after a period of use continue to be a problem when pins are substituted. A further problem which continues to exist is that the holes in the implement and the loader have to be somewhat larger than the diameter of the bolts or pins in order to reduce the considerable difficulty encountered in trying to align the corresponding holes of the two elements. The combination of the abrasive environment and the areas of high point stress with the loosely fitting bolts or pins in the holes causes considerable wear, and the stress often causes the bolts or pins to break. Furthermore, the stress occasionally causes the metal brackets of the implement and the loader to fatigue and eventually fracture or break. The problems encountered by using pins as an attachment and release device, as with the use of bolts and nuts, result in the potential flexibility and desirability of using a loader in connection with various agricultural implements simply not fully being achieved.

At a later date, U.S. and release devices, such as disclosed by the U. S. Pats. to Stuart U.S. Pat. No. 3,417,886 and Bauer et. al. U.S. Pat. No. 3,672,521, were developed. These semi-automatic devices eliminate many of the problems associated with the need to manually attach and release an implement from a loader which are associated with the use of bolts and nuts, or pins. For example, the chance of injury is substantially reduced by such means. Also, the time and effort, as well as the need for tools and the assistance of more than one person is substantially eliminated. Nevertheless, since such devices are merely semiautomatic, it is usually necessary for the operator to dismount from the tractor to align the implement precisely with the loader or to attach and release the two elements by use of the semiautomatic devices. Thus, the time, effort, and chance of injury are still present to some degree. In addition, it is still necessary on occasion for more than one person to be present to aid in the attachment or release of an implement from a loader. Finally, due to the dirt and corrosion associated with the abrasive environment in which agricultural machinery is characteristically used and the existence of high point stress areas, occasional fatigue and fracture of the semi-automatic attachment and release devices is a definite problem.

At a still later date, automatic attachment and release devices of the type disclosed in Westendorf U.S. Pat. No. 3,512,665 were developed. However, due to the design characteristics of such prior art devices, occasional fatigue and fracture resulting from areas of high point stress continues to be a problem. In addition, the dirt and corrosion commonly associated with the abrasive environment in which agricultural machinery is characteristically used often causes the operative elements of the automatic attachment and release devices of the prior art to become jammed. As a result, several of the problems which have long been associated with the art of providing an attachment means for attaching an implement to a loader continue to exist when the automatic attachment and release devices of the prior art are utilized.

In the field of quick attachment and release devices for attaching and releasing agricultural implements from loaders, the problems associated with the devices previously known to the art have remained considerable obstacles to reaching the full potential of versatility and desirability inherent in loaders attached to tractors. Although several of the problems commonly associated with the crude method of bolting agricultural implements to the spaced actuating arms of a loader have been eliminated, even the most sophisticated automatic attachment and release devices preceding the present invention have failed to eliminate a number of significant problems. The present invention of a quick attachment and release device for guided and automatic releasable attachment solves the problems which have plagued the field in the past and serves to aid the use of loaders in reaching their full potentiality as implement utilizing devices, as will be explained in greater detail below.

SUMMARY OF THE INVENTION

The present invention relates to the field of quick attachment and release devices for attaching a first element to a second element. More particularly, the present invention relates to the field of automatic and registrable quick attachment and release devices adapted to attach and release agricultural implements from spaced actuating arms of loaders. When the quick attachment and release device of the present invention is utilized, various agricultural implements can be used in connection with the loader, and the implements can be interchanged in a minimum of time and with a minimum of effort.

When the present invention is used for releasably attaching an implement to a pair of spaced actuating arms, a rectangular key is pivotally mounted to each of the actuating arms so that rotation about the transverse axis of the keys is possible. Also, a pair of C-shaped brackets are secured to an agricultural implement to be used with the loader in a manner permitting automatic engagement with the rectangular keys. Accordingly, each of the C-shaped brackets have an inner surface with a maximum inside dimension slightly greater than the major dimension of the rectangular key, and the brackets have an opening smaller than the major dimension but greater than the minor dimension to permit entry of the keys into the brackets. Finally, the quick attachment and release device is provided with an orientation bracket to orient the rectangular keys for passage through and engagement with the C-shaped brackets.

In operation, a tractor having a loader with spaced actuating arms is utilized. Near the end of each actuating arm is an actuating arm guide bracket which is pivotally mounted on the actuating arm. This guide bracket has a rectangular key which is, in turn, pivotally mounted for rotation about its transverse axis near the end of the actuating arm guide bracket adjacent to the pivotal mounting thereof. In addition, at the end of the actuating arm guide bracket opposite the rectangular key is a guide pin.

Attached to an agricultural implement located nearby are implement guide brackets registrable with the actuating arm guide brackets of the spaced actuating arms for locked engagement therewith. Integral with each of the implement guide brackets is a C-shaped bracket and a guide seat provided to mate with the rectangular key and the guide pin of each actuating arm guide bracket. In addition, near the opening of the C-shaped bracket, an orientation bracket is provided having a reverse curvature from that of the C-shaped bracket.

When an operator wishes to attach an agricultural implement to the spaced actuating arms of a loader, he drives the tractor toward the implement so that the actuating arm guide brackets of the spaced actuating arms align with the corresponding implement guide brackets attached to the implement. As he continues to approach the implement, the guide pins on the actuating arm guide brackets eventually engage the guide seats on the corresponding implement guide brackets of the agricultural implement. Engagement of the guide pins with the guide seats serves to guide the remaining portions of the quick attachment and release device toward engagement.

As the operator continues to ease the tractor forward, the actuating arm guide brackets pivot on the spaced actuating arms in a manner which moves the rectangular keys closer to engagement with the C-shaped brackets. Finally, the rectangular keys come into contact with the orientation brackets and the reverse curvature of the orientation brackets causes the rectangular keys to rotate about their transverse axes into a position in which they can pass through the openings in the C-shaped brackets. When the rectangular keys have finally passed through the openings and are within the C-shaped brackets, a second orientation means restores the rectangular keys to their normal positions. When the rectangular keys are in their normal positions within the C-shaped brackets, they cannot pass back through the openings therein. In this position, the rectangular keys are in locked engagement with the C-shaped brackets and the agricultural implement is then ready for use.

At a later time, when the operator desires to remove the agricultural implement from the spaced actuating arms, he simply moves a control lever which engages a release means of the quick attachment and release device. When this is done, an arm on each of the rectangular keys is rotated causing the rectangular keys to rotate about their transverse axes to a position where they can pass back through the openings in the C-shaped brackets until they are free from therefrom. When the rectangular keys are in this position, the operator can simply ease the tractor away from the implement, thereby causing the rectangular keys to become disengaged from the C-shaped brackets. Once this has been done, the operator can then simply continue to ease the tractor away from the implement until the guide pins of the actuating arm guide brackets finally are disengaged from the guide seats of the corresponding implement guide brackets. At this point, the spaced actuating arms are completely free of the implement, and if the operator wishes to use another implement, he can simply drive the tractor toward it to quickly attach it to the spaced actuating arms in the same manner. In this way, the automatic quick attachment and release device of the present invention provides a highly useful device for use with agricultural implements and loaders which saves time and energy, eliminates the need for tools, and protects against injury.

BRIEF DESCRIPTION OF THE DRAWING

FIG. 4 is a side elevation of the actuating arm guide bracket having a guide pin in engagement with a guide seat of a corresponding implement guide bracket and showing the rectangular key in a normal position as it moves toward engagement with an orientation bracket and a C-shaped bracket;

FIG. 5 is a side elevation of the actuating arm guide bracket having the guide pin in engagement with the guide seat of the corresponding implement guide bracket and showing the rectangular key in engagement with the orientation bracket in a position in which it can pass through the C-shaped bracket; and FIG. 6 is a side elevation showing the guide pin in locked engagement with the guide seat and the rectangular key in locked engagement with the C-shaped bracket.

DESCRIPTION OF THE PREFERRED EMBODIMENT

Figure 1:
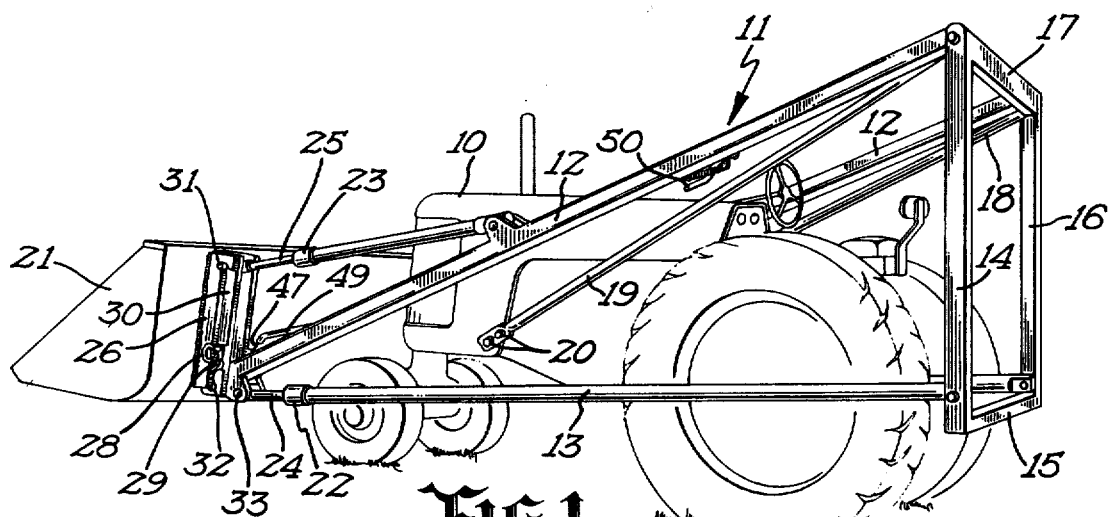
FIG. 1 is a perspective drawing of a tractor having a loader with spaced actuating arms and an implement attached thereto using the quick attachment and release device of the present invention.

Referring to FIG. 1, a tractor 10 is shown having a loader 11 with a pair of spaced actuating arms 12 and additional frame members 13, 14, 15, 16, 17, 18 and 19. Loader 11 is typically used on tractor 10 to attach an agricultural implement 21 thereto for use in various aspects of farm work. For that reason, it is frequently desirable to provide a number of implements useful to perform a wide range of tasks. However, in order to be of maximum benefit, the various agricultural implements to be used in connection with loader 11 must be quickly attachable and releasable from the spaced actuating arms 12 thereof. The quick attachment and release device of the present invention accomplishes the desired result.

Generally, the loader 11 is semi-permanently attached to the tractor 10 at appropriate locations by means such as bolts 20. In addition, means for lifting and tilting agricultural implement 21 integral with the loader 11, such as hydraulic cylinders 22 and 23 and pistons 24 and 25, is provided. Of course, the portion of the loader 11 which is not fully visible in FIG. 1 is substantially identical to the fully visible portion described herein.

Figure 2:
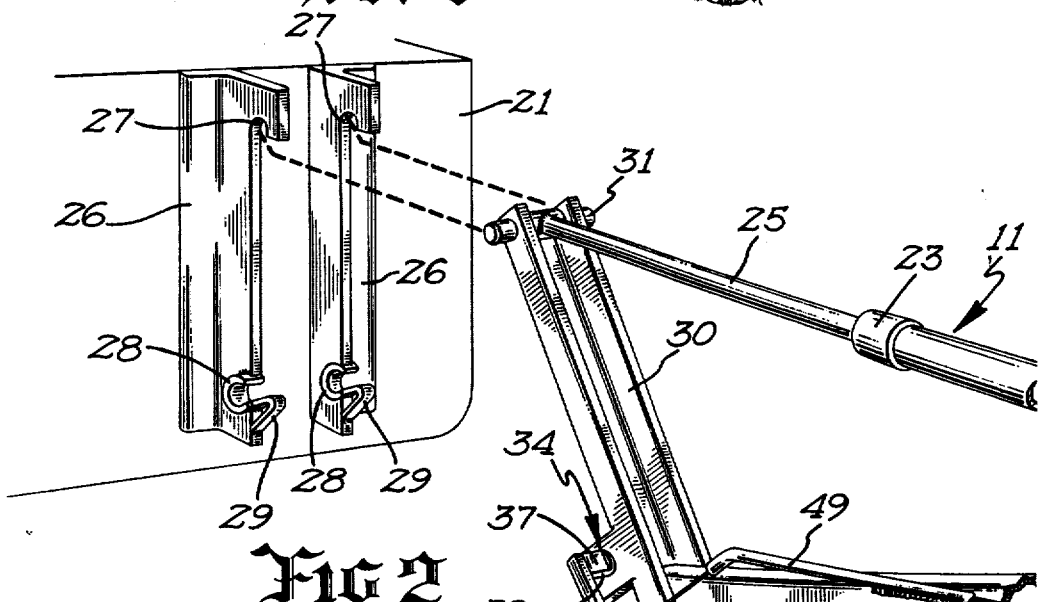
FIG. 2 is a close-up perspective drawing of a spaced actuating arm of a loader moving toward an agricultural implement for locked engagement therewith using the quick attachment and release device of the present invention.

Looking more closely to the quick attachment and release device of my invention, FIG. 2 shows a spaced actuating arm 12 of a loader 11 approaching an agricultural implement 21 for locked engagement therewith. In practice, it is preferred to provide a pair of implement guide brackets 26 corresponding to each spaced actuating arm 12. In addition, each of the implement guide brackets 26 are provided with a guide seat 27 and a C-shaped bracket 28. The C-shaped brackets 28 and guide seats 27 are spaced at opposite ends of the corresponding implement guide bracket 26. Finally, an orientation bracket 29 is provided for each of the implement guide brackets 26. The orientation brackets 29 are located near the openings of the corresponding C-shaped brackets 28. The orientation brackets 29, as FIG. 2 reveals, have a reverse curvature from that of the C-shaped brackets 28.

Looking to the spaced actuating arm 12 of FIG. 2, an actuating arm guide bracket 30 having a guide pin 31 is provided. The actuating arm guide bracket 30 is pivotally mounted about the pin 32 of the spaced actuating arm 12, and the piston 24 of the means for lifting and tilting an agricultural implement 21 is pivotally mounted about the pin 33. Also, the piston 25 of the means for lifting and tilting is pivotally mounted about the guide pin 31. The pistons are attached to the pins by a common means such as spot welding.

Figure 3:
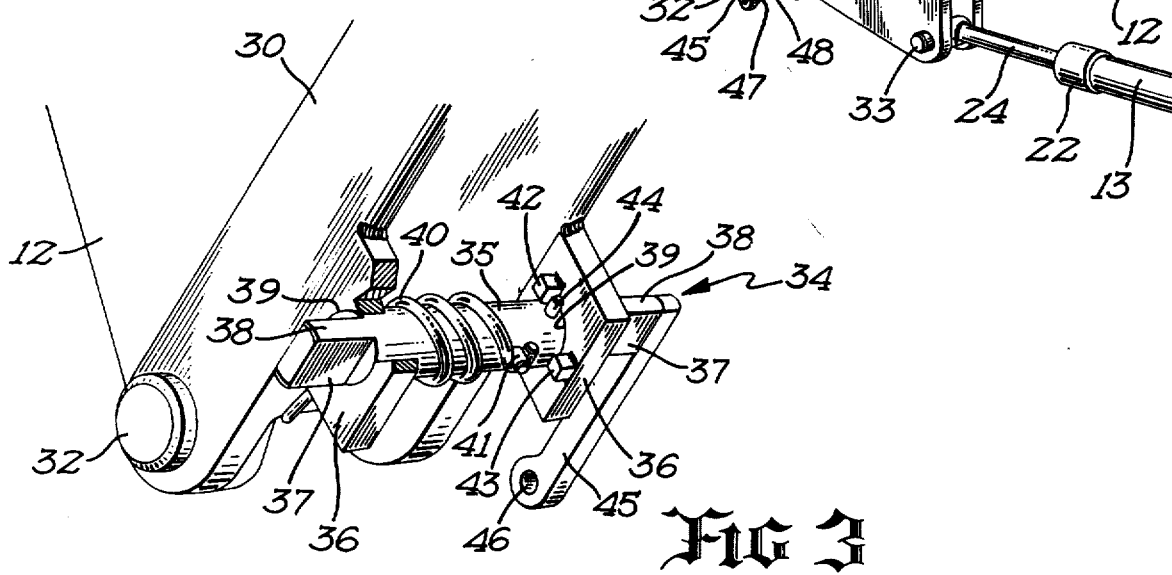
FIG. 3 is a close up perspective drawing of a spaced actuating arm having an actuating arm guide bracket pivotally mounted thereto which has a rectangular key of the present invention.

Referring now to FIG. 3, the relationship between the rectangular key 34 and the actuating arm guide bracket 30 is more clearly demonstrated. The rectangular key 34 comprises, in part, a cylindrical rod 35 projecting through two spaced flanges 36 which extend from the actuating arm guide bracket 30. One of the flanges 36 has a segment broken away for purposes of illustrating the relationship between the rod 35 and the flanges 36. The portions of the rod extending beyond the flanges 36 in both directions have cut-away portions so that along such portions the rod 35 has a generally rectangular cross-section. More specifically, the major dimension, or width, of the generally rectangular cross-section of the portions of the rod 35 extending beyond the flanges 36 is essentially the same as the diameter of the rod 35. In addition, the surfaces 37 corresponding to the major dimension are substantially planar. Furthermore, the minor dimension, or width, of the generally rectangular cross-section is essentially the same as the diameter of the rod 35 less the maximum width of the cut-away portions. Finally, the surfaces 38 corresponding to the minor dimension are arcuate. In fact, the surfaces 38 are of identically the same curvature as the rod 35.

In practice, the portion of the rectangular key 34 comprising the cylindrical rod 35 extends between the flanges 36 and completely through the circular holes 39 in the flanges 36 provvided therefor. By providing a cylindrical rod 35 of approximately the same diameter as the circular holes 39 in the flanges 36, a larger bearing surface for the stresses experienced during use of the quick attachment and release device is provided. Accordingly, the possibility of fatigue and frature of the operative elements of the present invention are substantially reduced.

The portions of the rectangular key 34 extending beyond the flanges 36 has a generally rectangular cross-section so that it may be oriented to pass through the opening in the C-shaped bracket 28. While it would be possible to provide the rectangular key 36 with a generally rectangular cross-section throughout its length, the preferred embodiment disclosed in FIG. 3 has the substantial advantage of being able to withstand much higher stresses.

As FIG. 3 reveals, a single rectangular key 34 is provided on each spaced actuating arm 12 for engagement with a pair of C-shaped brackets 28 corresponding thereto. As noted above, the rectangular key 34 is provided with a cylindrical rod 35 in its midsection and cut-away portions along each end where the cylindrical rod 35 projects from the flanges 36.

The distance that the cut-away portions of the rectangular key 34 extend beyond the flanges 36 determines the spacing of the two implement guide brackets 26, and therefore, the relative placement of the two corresponding C-shaped brackets 28. The distance must be sufficient to fully and adequately provide for locked engagement of the rectangular key 34 with both of the C-shaped brackets 28. By providing the rectangular key 34 for both of the C-shaped brackets 28 in a single element, the stresses experienced during use of the loader 11 in connection with an agricultural implement 21 are better distributed and the quick attachment and release device of the present invention is able, accordingly, to withstand much higher stresses than if a separate rectangular key 34 was to be provided for each of the respective C-shaped brackets 28.

The cylindrical rod 35 of the rectangular key 34 is provided with a restoring spring 40. The spring 40 is a helical coil compression spring with one end looped about peg 41 and the other end biased against actuating arm guide bracket 30. The spring 40 serves to hold the rectangular key 34 in a normal position which is generally vertical.

In order to hold the rectangular key 34 in a normal position and to constrain the key to movement from this position to a position substantially at a right angle thereto, a stop means having pegs 42 and 43 is attached to one of the flanges 36. The stop means also has a peg 44 attached to the rod 35. The pegs 42 and 43 are attached to the flange 36 adjacent to the surface of the cylindrical rod 35 and spaced approximately 90° apart with respect to the transverse axis of the rectangular key 34. The peg 44 is attached to the cylindrical rod 35 adjacent to the flange 36 and within the 90° arc of the cylindrical rod 35 defined by pegs 42 and 43. When the rectangular key 34 is in a normal position, the restoring spring 40 holds the peg 44 in contact with the peg 42. The peg 42 resists further rotational movement of the rectangular key 34 by the spring 40.

Referring to FIGS. 2 and 3, it can be seen that a lever arm 45 is provided as the primary operative element of a release means for the rectangular key 34. The lever arm 45 is attached to one end of the rectangular key 34 by a means such as spot welding. At the end of the lever arm 45 directly opposite the rectangular key 34, a hole 46 is provided through which the cable 47 is looped and secured by the clamp 48. This cable passes through the guide tube 49 which, in turn, extends into the hollow interior of the spaced actuating arm 12. Beyond that point, the cable 47 continues through the hollow interior of the spaced actuating arm 12 to a point adjacent to the area from which the operator drives and controls the tractor 10. At that point, the cable 47 is attached to control lever 50.

The control lever 50, as shown in FIG. 1, is the means by which the operator can release the rectangular key 34 from locked engagement with the C-shaped brackets 28. By manipulating the control lever 50, the operator puts tension on the cable 47 which displaces the lever arm 45, thereby rotating the rectangular key 34 against the biasing action of the spring 40. When the release means has moved the rectangular key 34 approximately 90°, the peg 44 on the cylindrical rod 35 is moved from engagement with peg 42 to engagement with peg 43. At this point, the lever arm 45 cannot be moved further. When the lever arm 45 has been moved to this position, the rectangular key 34 is in a position in which it can be removed from the C-shaped brackets 28.

Referring to FIG. 2, the operation of the quick attachment and release device of the present invention can be understood. When an operator wishes to quickly attach an agricultural implement 21, such as a dirt scoop, to the spaced actuating arms 12 of a front loader 11 attached to a tractor 10, he eases the tractor toward the implement 21 so that the guide pins 31 on each of the actuating arm guide brackets 30 are in substantial alignment with the guide seats 27 on the corresponding implement guide brackets 26 attached to the implement 21. As the operator continues to ease the tractor toward the implement 21, the guide pins 31 engage the guide seats 27 corresponding thereto, as shown in FIG. 4.

Once the guide pins 31 have engaged the guide seats 27, the operator continues to ease the tractor 10 toward the implement 21. As he does so, the actuating arm guide brackets 30 pivot about the pins 32 from a normal position which is generally vertical to a substantially vertical position. This, in turn, moves the rectangular keys 34 closer to the C-shaped brackets 28 and rotates the keys from a generally vertical, normal position to a substantially vertical position. After the operator has further eased the tractor toward the implement 21, the actuating arm guide brackets 30 continue to rotate about the pins 32 until the planar surfaces 37 of the rectangular keys 34 come into contact with the orientation brackets 29. At this point, both the actuating arm guide brackets 30 and the rectangular keys 34 are in a position which is substantially vertical.

When the operator continues to ease the tractor 10 toward the implement 21, the rectangular keys 34 are rotated about their transverse axes by the reverse curvature of the orientation brackets 29 from a substantially vertical position, as shown in FIG. 4, to a substantially horizontal position, as shown in FIG. 5. Once the rectangular keys 34 are in a substantially horizontal position, they are in a position in which they can pass through the openings in the C-shaped brackets 28, since the minor dimension of the end portions having generally rectangular cross-sections is in substantial alignment with and somewhat smaller than the width of the openings in the C-shaped brackets 28. Accordingly, the rectangular keys 34 are in a position to be moved into locked engagement with the C-shaped brackets 28.

Finally, as the operator continues to ease the tractor 10 toward the implement 21, the actuating arm guide brackets 30 pivot about the pins 32 until they are in the substantially vertical position shown in FIG. 6. At this point, the rectangular keys 34 are fully contained within the C-shaped brackets 28. Once the rectangular keys 34 have been moved to this position, the springs 40 are free to restore the rectangular keys 34 back to their normal positions since the major dimension of the rectangular keys 34 is substantially the same as the inside diameter of the C-shaped brackets 28. When the rectangular keys 34 have been restored to their normal position, they are in locked engagement with the C-shaped brackets 28 and the pegs 44 are biased against the pegs 42 to hold the rectangular keys 34 in this position. Since the rectangular keys 34 of each of the spaced actuating arms 12 will be in locked engagement with the C-shaped brackets 28 corresponding thereto, and since the guide pins 31 will be in locked engagement with the guide seats 27, the agricultural implement 21 will then be ready for use.

At a later time, when the operator wishes to remove the agricultural implement 21 and either use the tractor 10 for other purposes or place another agricultural implement on the spaced actuating arms 12, the operator simply drives the tractor 10 to the location where he wishes to store the agricultural implement 21. When he has done this, he utilizes the means for lifting and tilting, such as hydraulic cylinders 22 and 23, and pistons 24 and 25, and places the agricultural implement 21 in such location. Next, the operator operates the control lever 50, thereby putting tension on the cable 47. The cable 47, in turn, displaces the lever arm 45, thereby rotating the rectangular keys 34 against the biasing action of the spring 40. When the rectangular keys 34 have been rotated from a position in which the pegs 44 are in engagement with the pegs 42 to a position in which the pegs 44 are in engagement with the pegs 43, the rectangular keys 34 will be in a position such as that shown in FIG. 5. Then, the operator can simply ease the tractor 10 away from the implement 21 to remove the rectangular keys 34 from the C-shaped brackets 28. Once the rectangular keys 34 have passed through the openings in the C-shaped brackets 28 and passed over the reversed curvature of the orientation brackets 29, the control lever 50 can be released and the springs 40 will restore the rectangular keys 34 once again to their normal positions.

When the rectangular keys 34 have been removed from the C-shaped brackets 28, and have passed over the reverse curvature of the orientation brackets 29, the operator can simply continue to ease the tractor 10 away from the implement 21, thereby continuing to pivot the actuating arm guide brackets 30 about the pins 32. Finally, the guide pins 31 of the guide brackets 30 are disengaged from the guide seats 27 of the corresponding implement guide brackets 26. When this has been accomplished, the tractor 10 and loader 11 are free from the agricultural implement 21 and can be used for other purposes.

In practice, it is preferred to use a pair of C-shaped brackets 28 and guide seats 27 on each side of an agricultural implement 21 and spaced a distance corresponding to the distance between the spaced actuating arms 12 of a loader 11. The C-shaped brackets 28 and guide seats 27 are integrally formed in the corresponding implement guide brackets 26. In addition, it is preferred to use a single guide pin 31 and a single rectangular key 34 for use in conjunction with each spaced actuating arm 12. The guide pins 31 and rectangular keys 34 extend completely through each of the corresponding actuating arm guide brackets 30.

As taught above, when this preferred embodiment is used, the guide pins 31 and the rectangular keys 34 are of a length slightly greater than the distance between the pair of C-shaped brackets 28 and guide seats 27 corresponding to each spaced actuating arm 12. The reason for doing this is to provide guide pins 31 and rectangular keys 34 which are unitary elements capable of withstanding the high stresses often experienced during use of an agricultural implement with a loader. Also, by providing unitary elements in this manner, an attachment having far greater strength and stability is provided. In fact, the quick attachment and release device of the present invention is capable of locking an agricultural implement in tight engagement with the spaced actuating arms of a loader so that the implement is substantially constrained against any yawing, pitching or rolling motion. This factor results in substantially less wear of the elements and, accordingly, a substantially reduced possibility of fatigue and fracture.

It should be understood that the C-shaped bracket and rectangular key of my invention can be utilized for quickly attaching and releasing any first member to any second member. Also, it is to be understood that the guide pin and guide seat provided in the preferred embodiment when the present invention is used in connection with agricultural implements and loaders is optional. However, it has been found that the quick attachment and release device of the present invention has substantial advantages as disclosed and is particularly suitable for use in connection with agricultural implements and loaders.

Another embodiment which is possible with the present invention is to reverse the role of the rectangular keys and the C-shaped brackets. When this embodiment is used, the rectangular keys are secured to the agricultural implement and the C-shaped brackets are secured to the spaced actuating arms of the loader. When the roles of these two elements are reversed, the C-shaped brackets 28 must be the movable element since they are mounted on the spaced actuating arms 12 in this embodiment and are the only elements which can be controlled by an operator on a tractor 10. While this embodiment is possible, it is less desirable due to the difficulty which is encountered in providing movable C-shaped brackets 28 and in aligning the C-shaped brackets 28 with the rectangular key 34 for locked engagement. Accordingly, the preferred embodiment disclosed above has substantial advantages, the primary advantage being that the rectangular keys 34 are the movable element and the C-shaped brackets 28 are stationary.

Other possible embodiments of my invention include providing a single C-shaped bracket on each side of an agricultural implement and providing a single rectangular key somewhat longer than the distance between the spaced actuating arms and running therebetween. When this embodiment is used, the single rectangular key engages both C-shaped brackets to attach an agricultural implement to the spaced actuating arms of a loader for use therewith. Still another possible embodiment of my invention includes providing the C-shaped brackets and rectangular keys in any possible orientation. For instance, the rectangular keys could be provided having their transverse axes lying in a vertical direction. When this is done, the C-shaped brackets would be provided lying in a substantially horizontal plane. While these and other possible embodiments are possible and fall within the scope of my invention, I have found that the preferred embodiment disclosed above has substantial advantages.

With use of the present invention, a guided and automatic quick attachment and release device for releasably attaching agricultural implements to spaced actuating arms of loaders is provided. Since various agricultural implements such as snow scoops, dirt scoops, rock pickers, silage forks, manure forks and hay baskets can quickly and easily be interchanged for use with a loader attached to a tractor, the versatility of the loader is greatly enhanced. Other advantages of the present invention include eliminating the requirement for the services of more than one person in attaching an implement to a loader. Also any need for tools in attaching an implement to a loader is completely eliminated. In addition, even though the implements generally utilized in connection with the loader are heavy items of machinery having considerable size, a minimum of time and effort is required with use of the present invention to attach such implements to the loader. Finally, since the operation of securing an implement to a loader by use of the present invention is automatic, the problems generally associated with the manual operation required by previously known means for attaching implements to loaders, such as the difficulty in aligning the holes of an implement with the corresponding holes of the loader and the substantial change of injury existing as a result thereof, are essentially eliminated.

Other advantages inherent in the use of my invention include eliminating the existence of areas of high stress concentrated at points of attachment. As a result of use of the present invention, the considerable wear normally associated at points where implements are connected to loaders is substantially reduced. Therefore, the occasional fatigue and fracture associated with prior art attachment devices is substantially reduced. In addition, the use of the present invention, while eliminating the need for tools, also eliminates the problems normally associated with the attachment areas becoming encased with dirt and corrosive materials. Since the attachment and release operation is essentially automatic, the present invention rids itself of dirt and corrosion during the attachment and release operation. The cooperation of the mechanical elements of my invention when attaching an implement to a loader or releasing an implement from a loader simply scrapes the dirt and corrosion from the quick attachment and release mechanism.

While I have shown a specific embodiment of the quick attachment and release device for purposes of illustration only, it is to be understood that the invention is to be limited solely by the scope of the apended claims.

I claim as my invention:

1. A quick attachment and release device for releasably attaching a first member to a second member which comprises:

a rectangular key having a major and a minor dimension pivotally mounted to said first member for rotation about the transverse axis of said key and biased toward a normal position;

a C-shaped bracket secured to said second member to permit registration with said rectangular key, and having an inner surface with a maximum inside dimension slightly greater than said major dimension and an opening smaller than said major dimension and greater than said minor dimension to thereby permit entry of said key into said bracket; and means for orienting said rectangular key wherein said rectangular key is oriented away from said normal position for passage through said opening of said C-shaped bracket and returns toward said normal position within said C-shaped bracket for locked engagement therewith.

2. The apparatus of claim 1 wherein said means for orienting said rectangular key comprises first means for rotationally displacing said rectangular key for passage through said opening of said C-shaped bracket and second means for biasing said rectangular key toward said normal position for locked engagement with said C-shaped bracket.

3. The apparatus of claim 2 wherein, when said rectangular key is in said normal position, said major dimension of said rectangular key is substantially at a right angle to a position for passage through said opening in said C-shaped bracket and wherein, when said rectangular key is within said C-shaped bracket for locked engagement therewith, said major dimension is substantially parallel to said maximum inside dimension of said C-shaped bracket.

4. The apparatus of claim 3 wherein said first means comprises an orientation bracket having a reverse curvature from that of said C-shaped bracket and secured thereto, said first means being so positioned that when said key is moved toward engagement with said C-shaped bracket, said orientation bracket engages said rectangular key in said normal position and as said key is further moved toward engagement with said C-shaped bracket said key is rotationally displaced about the transverse axis by said reverse curvature from said normal position to a position substantially at a right angle thereto for passage through said opening in said C-shaped bracket and wherein said second means comprises a spring disposed to restore said rotationally displaced key from said position for passage through said opening in said C-shaped bracket to said normal position for locked engagement therewith.

5. The apparatus of claim 4 wherein said rectangular key is constrained to rotational displacement from said normal position to a position substantially at a right angle thereto by stop means.

6. A quick attachment and release device for releasably attaching an agricultural implement to a pair of spaced actuating arms of a loader comprising:

a rectangular key pivotally mounted to each of said actuating arms for rotation about the transverse axes of said keys between a first position and a normal position, each of said keys having a major and a minor dimension;

a pair of C-shaped brackets secured to said implement to permit registration with said rectangular keys, each of said brackets having an inner surface with a maximum inside dimension slightly greater than said major dimension and an opening smaller than said major dimension and greater than said minor dimension to thereby permit entry of said keys into said brackets;

first means for orienting said rectangular keys to said first position for passage through said openings of said C-shaped brackets; and second means for orienting said rectangular keys to said normal position within said C-shaped brackets for locked engagement therewith.

7. The apparatus of claim 6 wherein an actuating arm guide bracket is provided for each of said actuating arms, each actuating arm guide bracket having an elongated member pivotally mounted to one of said actuating arms near the extremity thereof, and each elongated member having a guide pin positioned near the end thereof directly opposite said pivotal mounting, and wherein a pair of implement guide brackets is provided corresponding to each actuating arm guide bracket and mounted to said implement to permit registration therewith, each corresponding implement guide bracket having a guide seat for engagement with a portion of one of said guide pins and a C-shaped bracket for engagement with a portion of one of said rectangular keys, and wherein each rectangular key is pivotally mounted to one of said elongated members near the pivotal mounting thereof to said actuating arm.

8. A quick attachment and release device for releasably attaching a first member to a second member which comprises:

a rectangular key having a substantially planar major and a minor dimension pivotally mounted to said first member for rotation about the transverse axis of said key;

a C-shaped bracket secured to said second member to permit registration with said rectangular key, and having an inner surface with a maximum inside dimension slightly greater than said major dimension and an opening smaller than said major dimension and greater than said minor dimension to thereby permit entry of said key into said bracket; and means for orienting said rectangular key for passage through said opening of said C-shaped bracket and for pivoting said rectangular key to orient said key with said minor dimension of said rectangular key substantially contiguous with said inner surface of said C-shaped bracket for locked engagement therewith.

* * * * *